United States Patent
Chang (10) Patent No.: US 6,992,803 B2
(45) Date of Patent: Jan. 31, 2006

(54) RGB PRIMARY COLOR POINT IDENTIFICATION SYSTEM AND METHOD

(75) Inventor: Chin Chang, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 872 days.

(21) Appl. No.: 09/851,099

(22) Filed: May 8, 2001

(65) Prior Publication Data

US 2003/0011832 A1 Jan. 16, 2003

(51) Int. Cl.
*H04N 1/46* (2006.01)

(52) U.S. Cl. .................. 358/509; 358/512; 358/475

(58) Field of Classification Search .............. 235/454; 315/149; 137/3; 358/505, 509, 506, 501, 358/475, 512, 515, 520; 382/162, 167
See application file for complete search history.

(56) References Cited

U.S. PATENT DOCUMENTS

| | | | | |
|---|---|---|---|---|
| 4,256,131 A | * | 3/1981 | De Remigis | 137/3 |
| 6,127,783 A | * | 10/2000 | Pashley et al. | 315/149 |
| 6,510,995 B2 | * | 1/2003 | Muthu et al. | 235/454 |
| 2003/0011832 A1 | * | 1/2003 | Chang | 358/518 |
| 2003/0098930 A1 | * | 5/2003 | Seo et al. | 348/806 |

FOREIGN PATENT DOCUMENTS

| | | | | |
|---|---|---|---|---|
| JP | 61243442 | * | 10/1986 | |
| JP | 06149169 | * | 5/1994 | 345/30 |
| KR | 2002067189 A | * | 8/2002 | |

* cited by examiner

*Primary Examiner*—Jerome Grant, II (57) ABSTRACT

A system and method for identifying primary color chromaticity coordinates of a red, green and blue light sources includes a tristimulus filter the receives the combined light generated by the light sources. The light sources are preferably a group of red, green and blue light emitting diodes. A processor is configured to generate a plurality of test control signals that sets a desired intensity value for each of the red, green and blue LEDs. Based on these test control signals, the system is configured to measure three sets of chromaticity coordinates corresponding to the combined light generated by these red, green and blue LEDs. The processor thereafter calculates the color chromaticity coordinates of the LEDs, based on the measured coordinates of the combined light, and the intensity values of the LEDs, and the intensity values of the combined light. This calculation in accordance with one embodiment of the invention is accomplished by solving a matrix equation. Once the color coordinates of the individual light sources is uniquely calculated, the system measures the intensity values of light for each of the light sources that is necessary to provide a combined light with a desired color chromaticity coordinates. These intensity values can be used in a feedback control circuit to maintain the desired combined light as the LEDs change their characteristics from batch to batch or over time.

14 Claims, 5 Drawing Sheets

RGB PRIMARY COLOR POINT IDENTIFICATION SYSTEM AND METHOD

FIELD OF THE INVENTION

This invention relates to a color coordinate measurement system and more specifically to an RGB primary color point identification and measurement system.

BACKGROUND OF THE INVENTION

There is a continuous stride to improve the ways to calibrate color images generated by electronic systems, such as scanners, displays, printers, etc. With the increasing use of light emitting diodes (LEDs) in a variety of applications, many manufacturers of devices that employ LEDs need efficient and reliable schemes to ensure quality and consistency in their products.

However, it is well known that due to various reasons, LEDs do not exhibit consistent characteristics. For example, various batches of LEDs manufactured under similar factory conditions generate light that falls within a range of physical properties. Furthermore, those LEDs that have exact same characteristics at the outset, may perform differently over time due to dissimilar use and aging process.

An exemplary use of LEDs is in the process of generating a white light by employing primary colors of Red, Green and Blue (RGB) LEDs. For example, many LCD monitors use an array of red, green and blue LEDs to generate a white backlight. In order to ensure that the white light has a consistent color temperature and intensity, many manufacturers employ complex calibration schemes which lead to higher manufacturing costs.

The reason that it is difficult to ensure that a device such as a monitor generates a consistent white backlight is that the color coordinates for each of the red, green and blue light sources are hard to measure. In accordance with one prior art scheme, it is possible to measure the color coordinates for each primary red, green and blue light sources by performing a sequential measurement procedure as explained below.

During the first step of this sequential procedure, the red and green light sources are turned off, and only the blue primary color point is measured. Then, the red and blue light sources are turned off, and the green primary color point is measured. Finally, the green and blue light sources are turned off, and the red primary color point is measured. However, this scheme does not have a high numerical accuracy, as will be explained in more detail in reference with FIGS. 4 and 5.

Thus, there is a need for a system that can accurately and economically measure the color coordinates for each of the primary red, green and blue light sources, such as LEDs, so as to generate a consistent and desired white light, or for that matter, any light that employs these three primary light sources.

SUMMARY OF THE INVENTION

In accordance with one embodiment of the present invention, a primary color identification system includes a plurality of red, green and blue LED light sources configured to generate a desired RGB light having specified chromaticity coordinates. A color filter, such as a tristimulus filter, is disposed near the generated RGB light, and is coupled to a processor that is employed to measure the chromaticity coordinates of each of the red, green and blue LED light sources. The system also includes a controller and driver circuitry that is configured to control and maintain the intensity of light (or lumen output level) generated by each of the red, green and blue LEDs. The system for a given intensity of the red, green and blue LED light source, measures the intensity of the generated RGB light, while the color filter measures the chromaticity coordinates of the generated RGB light. Based on these measurements, the system is configured to detect the chromaticity coordinates of each of the red, green and blue LED light sources.

Once the chromaticity coordinates of the LED light sources is known, the system configures the controller and driver circuitry to maintain the desired intensity (or lumen output level) of each of the red, green and blue LED light sources, so as to maintain the desired chromaticity coordinates of the generated RGB light.

In accordance with another embodiment of the invention, a method for determining the color coordinates of primary colors that together generate a desired light source, is introduced. The primary colors that generate a desired light source may be red, green and blue LED light sources. The method includes the step a) of setting the intensity of each of said red, green and blue light sources at a specified test level. The method is followed by the step b) of measuring the color coordinates of the combined light source by using a color filter. The method then repeats the preceding two steps a) and b) in step c), so as to measure a plurality of color coordinates of the combined light source, each coordinate corresponding to a different set of test intensity levels for each of the red, green and blue light sources. Step c) of the method is followed by the step d) of measuring the primary color coordinates of each of the red, green and blue LED light sources, and finally, providing a feedback arrangement to maintain the intensity of the three LED light sources at a level that leads to a combined light source with a desired chromaticity coordinate.

In accordance with another embodiment of the invention, the different intensity values for each red, green and blue light source are set such that for each set the intensity value of the combined light source remains the same. In accordance with yet another embodiment of the invention many test sets are employed and the primary color coordinates for each of the red, green and blue light sources are calculated by applying a least mean square estimation technique.

BRIEF DESCRIPTION OF THE DRAWINGS

FIGS. 4*a*–4*c* illustrate schematic diagrams of tristimulus filters employed in accordance with some embodiments of the invention.

DETAILED DESCRIPTION OF THE DRAWINGS

Figure 1:
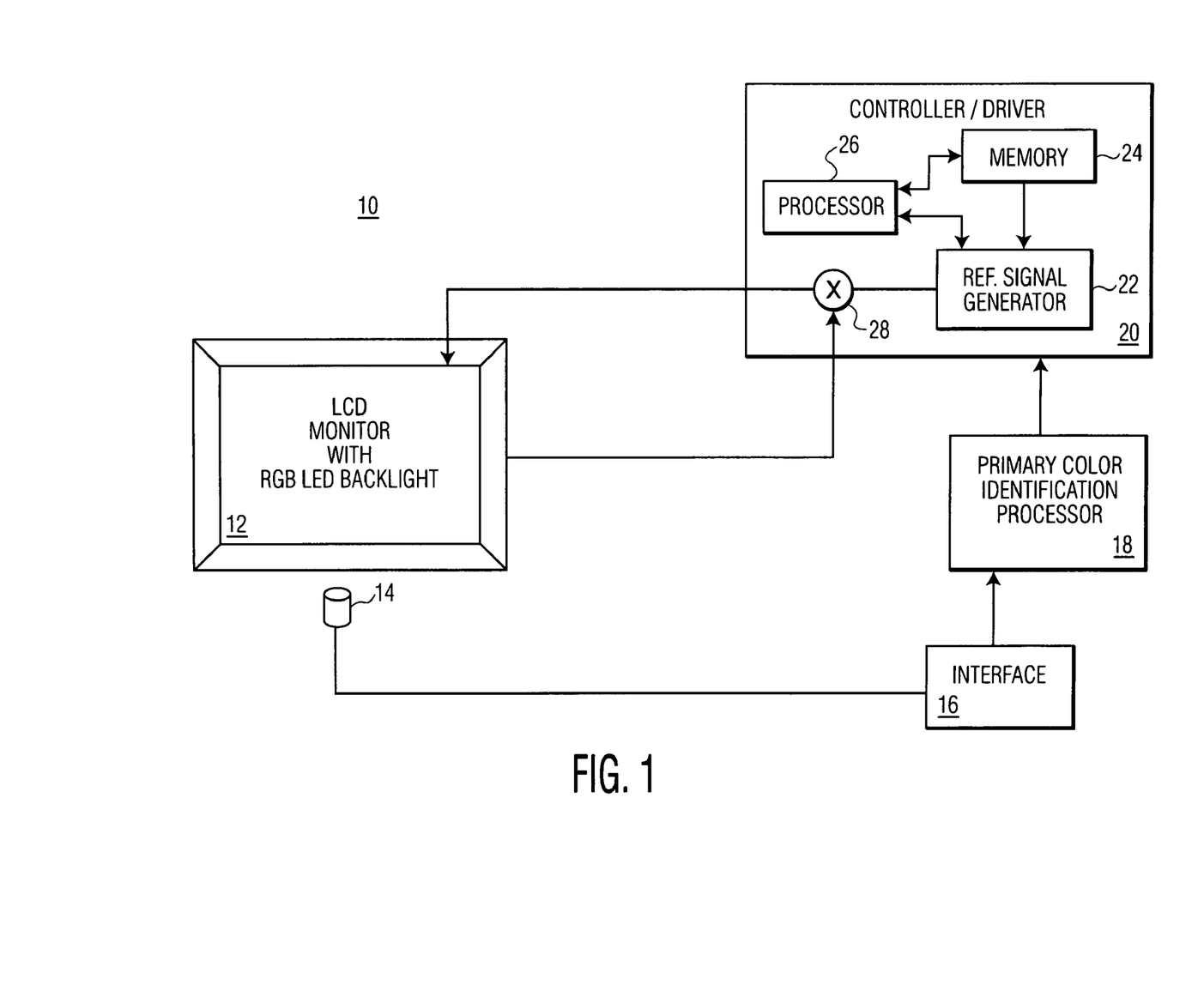
FIG. 1 illustrates a block diagram of a primary color identification system in accordance with one embodiment of the invention.

FIG. 1 illustrates a block diagram of a primary color identification system 10 in accordance with one embodiment of the invention. The system is configured to determine the chromaticity coordinates of primary colors generated by red, green and blue LEDs that together provided a white light in an LCD monitor 12. The white light in this example is generated for backlighting the LCD monitor. It is noted that the invention is not limited in scope to this example, and system 10 in accordance with other embodiments of the invention can be employed to determine the color coordinates of primary colors that together form any desired light source.

A filter 14 is disposed in front of monitor 12 so as to measure certain characteristics of the white light generated by LCD monitor 12. As will be explained in more detail later in reference with FIGS. 4 and 5, filter 14 in accordance with one embodiment of the invention comprises a photo sensor with color filters that together operate as—what is known in the industry as—a tristimulus filter.

Filter 14 is coupled to an interface circuit 16 that is configured to receive the signals generated by filter 14, and condition these signals for use with a primary color identification processor 18. Processor 18 is coupled to interface 16, and is configured to take the steps necessary to determine the color coordinates of individual red, green and blue LED light sources employed in monitor 12.

Figure 4A:
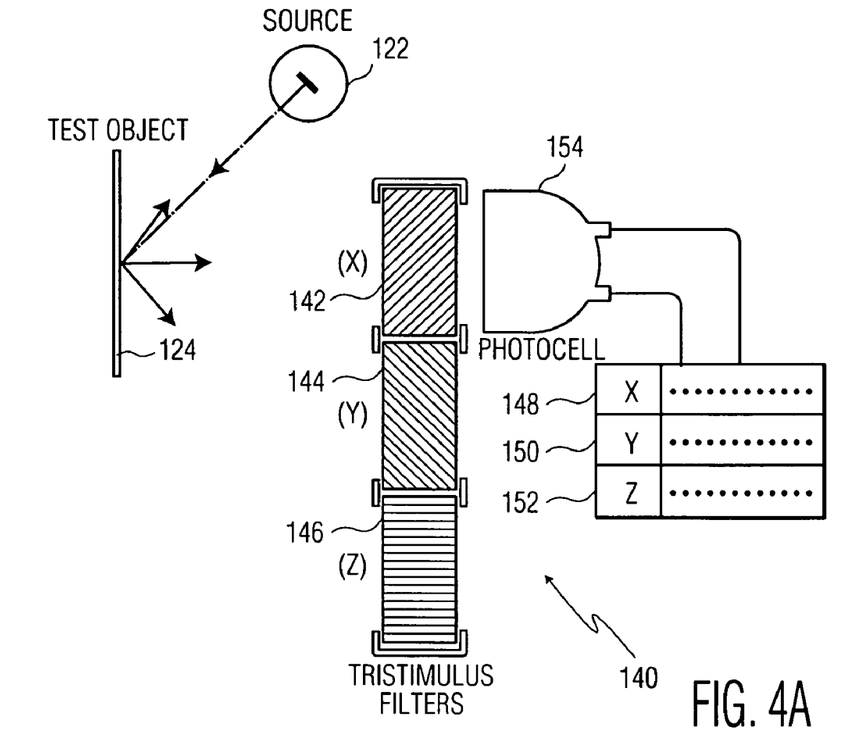
Figure 4B:
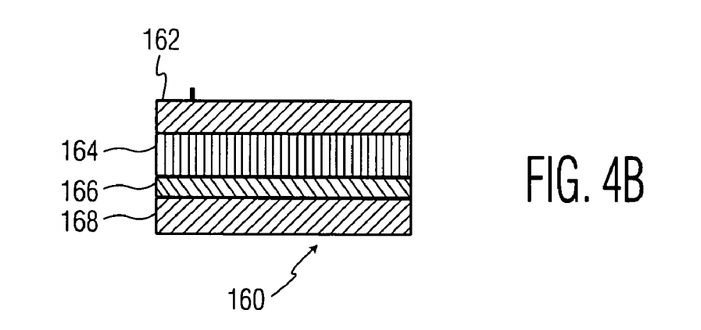
Figure 4C:
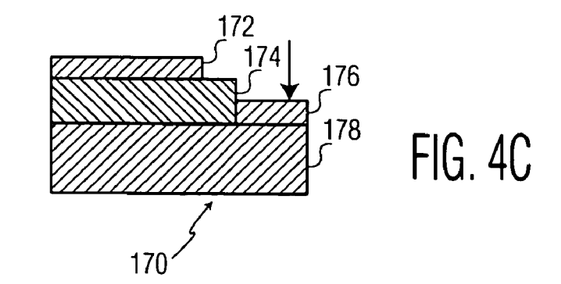

The operation and structure of tristimulus filter 14 is well known. FIGS. 4(*a*), 4(*b*) and 4(*c*) illustrate block diagrams of three exemplary tristimulus filters that are employed in accordance with various embodiments of the invention. Basically, a tristimulus filter is configured such that the spectral response functions of the filters are directly proportional to the color-matching functions of CIE standard colorimetric observers.

FIG. 4(*a*) illustrates the arrangement and function of a tristimulus filter 140. The tristimulus filter of FIG. 4(*a*) includes three glass filters 142, 144 and 146, each of which are configured to filter respectively the red, green and blue lights contained in a light generated by source 122 and reflected by a test object 124. One or more photocells 154 are disposed behind the glass filters to measure the light output for each of the red, green and blue light components. Registers 148, 150 and 152 are configured to store the light information corresponding to CIE 1931 standard observer. Thus, register 148 stores information corresponding to the light passing through filter 142. Similarly, register 150 stores information corresponding to the light passing through filter 144. And, register 152 stores information corresponding to the light passing through filter 146.

Figure 5A:
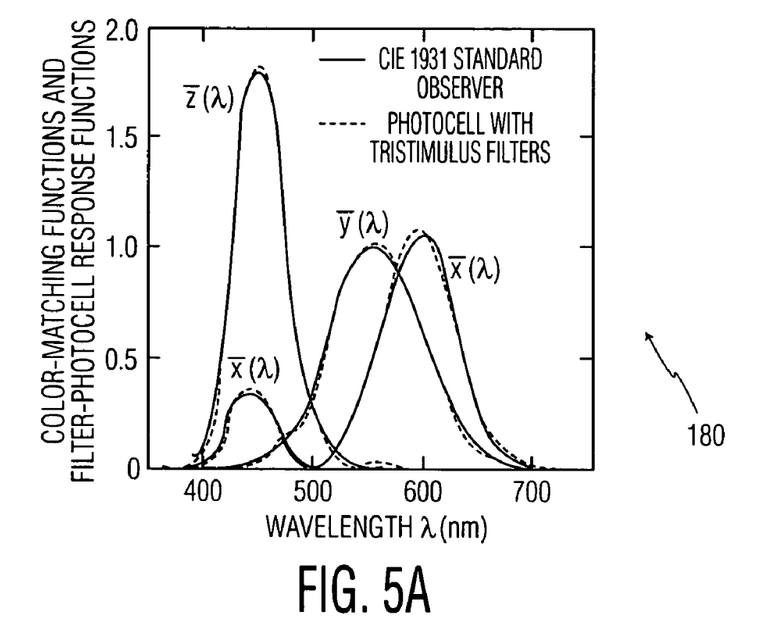
FIGS. 5*a* and 5*b* are plot diagram illustrating examples of a spectral response function of filters employed in accordance with one embodiment of the present invention.

To this end, FIG. 5(*a*) illustrates a plot 180 which depicts the spectral response functions and the degree to which a photocell, such as 154, combined with tristimulus filters 140 may best duplicate the color-matching functions of the CIE 1931 standard observer. The solid curves illustrate the CIE standard observer data, and the dotted curves illustrate response of the photocell with tristimulus filter arrangement.

Other examples of tristimulus filters are illustrated in FIGS. 4(*b*) and 4(*c*) wherein filter glass layers are disposed over a filter substrate. Therefore, as illustrated in FIG. 4(*b*) a substrate 168 receives a glass layer 166, overlapped by a glass layer 164, which in turn is overlapped with a glass layer 162. FIG. 4(*c*) illustrates another variation of glass layers on a substrate 178 wherein layer 172 does not completely cover layer 174, and layer 174 does not completely cover layer 176.

Figure 5B:
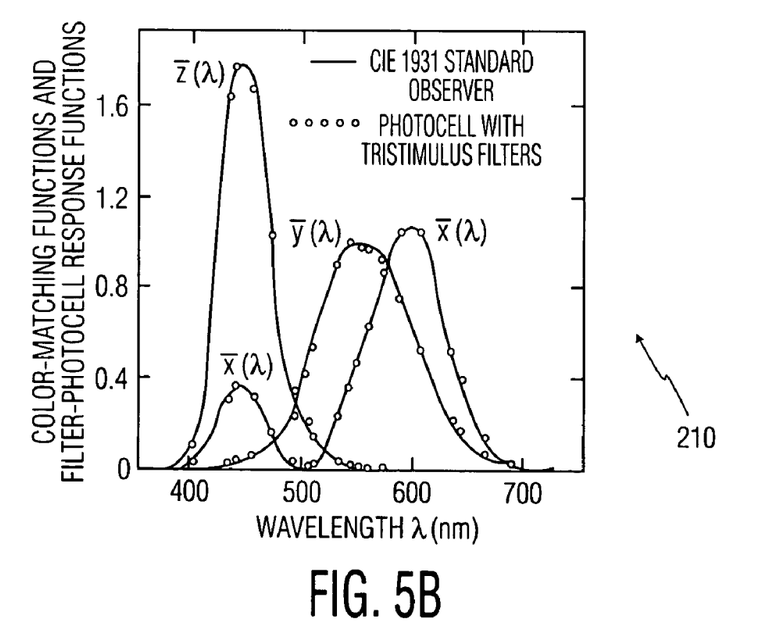

To this end, FIG. 5(*b*) illustrates a plot 210 which depicts the spectral response functions and the degree to which a photocell, such as 154, combined with the tristimulus filters 160 or 170, may best duplicate the color-matching functions of the CIE 1931 standard observer. The solid curves illustrate the CIE standard observer data, and the dotted curves illustrate response of the photocell with tristimulus filter arrangement.

System 10 also includes a controller 20 that is coupled to processor 18. Controller 20 is configured to generate test signals that are estimated by processor 18 in order to determine the color coordinates of each of the red, green and blue light sources employed in monitor 12. Furthermore, controller 20 stores the color coordinate information so as to control the signals used to drive the light sources to maintain the generated light by monitor 12 at a desired level.

In accordance with one embodiment of the invention, controller 20 includes a memory unit 24 coupled to a processor 26. Memory 24 stores, among other information, the primary color coordinates of each of the red, green and blue LED light sources used in monitor 12. Memory 24 is coupled to a signal generator 22, which is configured to generate driving signals, such as current signals, provided to the red, green and blue LED light sources.

Controller 20 includes a feedback arrangement, so as to allow the system to maintain a desired white light generated by monitor 12. This feedback arrangement includes a mixer 28 that is configured to receive feedback signals from monitor 12 so as to compare with the driving signals generated by generator 22. Processor 26 sets the desired signal levels generated by signal generator 22 based on the information stored in memory unit 24.

The operation of primary color identification processor 18 is explained in more detail hereinafter. Generally, the sensation of color is evoked by the physical stimulation of light-sensitive elements in the human retina. This physical stimulation consists of electromagnetic radiation in the visible spectrum comprising wavelengths between 380 nm and 780 nm. The light sensitive elements in the human eye, called cones, can be separated into three classes, each class being sensitive to a different spectral distribution of the radiation. As a result, many different spectral distributions can produce the same perceived color. This means that the spectral distribution of two compared colors might differ even when the colors are perceived to match.

However, in an application that employs RGB LED light sources, it is important to identify the color coordinates of each red, green and blue light source components, in order to control and maintain the desired combined light color and intensity.

Figure 2:
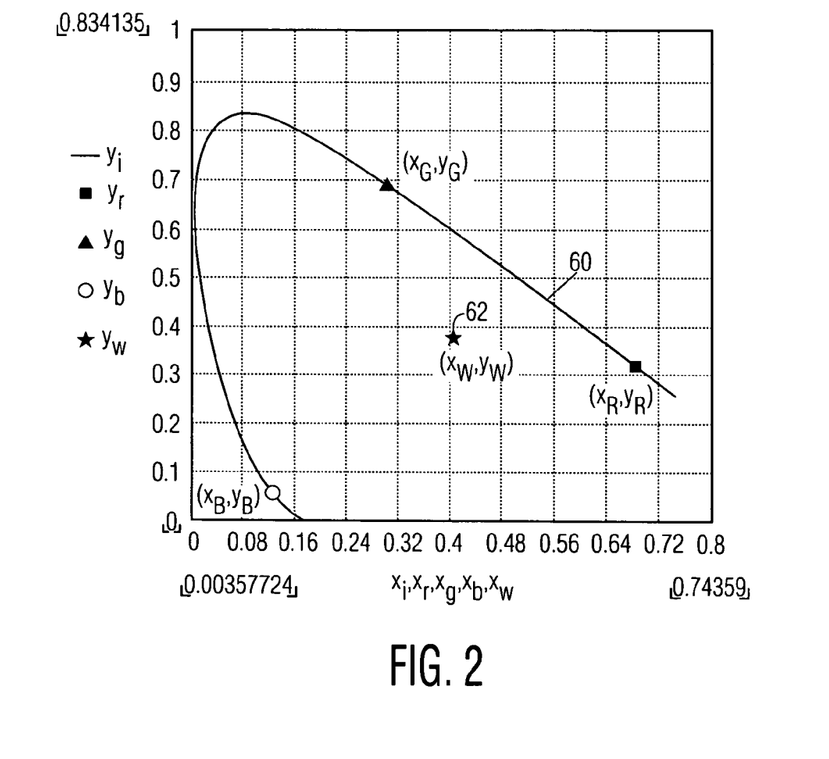
FIG. 2 is plot of a chromaticity diagram employed by the primary color identification system in accordance with one embodiment of the invention.

FIG. 2 is a plot of a chromaticity diagram as defined by the International Lighting Committee, abbreviated as CIE (Commission Internationale de l'Eclairage), and used by processor (18) in accordance with one embodiment of the present invention. Basically, the CIE chromaticity diagram of FIG. 2 illustrates information relating to a standard set of reference color stimuli, and a standard set of tristimulus values for them. Typically, the reference color stimuli are radiations of wavelength 700 nm for the red stimulus (R), 541.6 nm for the green stimulus (G) and 435.8 nm for the blue stimulus (B). Different color points along curve 60 can be combined to generate a white light depicted at point 62. The chromaticity diagram shows only the proportions of tristimulus values; hence bright and dim colors having the same proportions belong to the same point.

A desired white light at point 62 has coordinates $x_w$ and $y_w$ and intensity $I_w$ which represents the total lumen output of the white light. The three primary colors, Red, Green and Blue chromaticity coordinates and the lumen outputs for each are donated as $(x_R, y_R), (x_G, y_G), (x_B, y_B)$ and $I_R, I_G, I_B$ respectively. The total lumen output and the primary color lumen outputs are related as $$I_w = I_R + I_G + I_B \tag{1}$$

By normalizing equation (1), the lumen output relationship is defined as $$1 = I_R' + I_G' + I_B' \tag{2}$$

where $I_R'$, $I_G'$, $I_B'$ are called the lumen output fraction of the primary color sources. With the specified chromaticity coordinates of the primary colors and the associated lumen output fractions, it is possible to generate a specified color, such as white, and represent this desired color on the chromaticity diagram via $$\begin{bmatrix} \frac{x_w}{y_w} \\ 1 \\ \frac{1}{y_w} \end{bmatrix} = \begin{bmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{bmatrix} * \begin{bmatrix} I_R' \\ I_G' \\ I_B' \end{bmatrix} \quad (3)$$

From equation (3) it is possible to uniquely determine the coordinates of color points of a light having a desired color with coordinates $(x_w, y_w)$ and a desired lumen output $I_w$ based on the primary color points and their associated lumen fractions.

The LED lumen output is determined by $$I_v(I_f, T) = I_v(I_{test}, 25C)\left(\frac{I_f}{I_{test}}\right)e^{K(T-25C)} \quad (4)$$

where $I_v(I_f, T)$ is the luminous intensity at LED forward current $I_f$ and ambient temperature T, $I_v(I_{test}, 25C)$ is the data sheet luminous intensity at the forward current $I_{test}$ and 25 C, and K is the temperature coefficient of the LEDs. A typical K value for AlInGaP is −0.010/C. Therefore, for a given LED, forward current signal and ambient temperature, it is possible to determine its lumen output based on equation 4, in accordance with one embodiment of the invention as will be described below.

Figure 3:
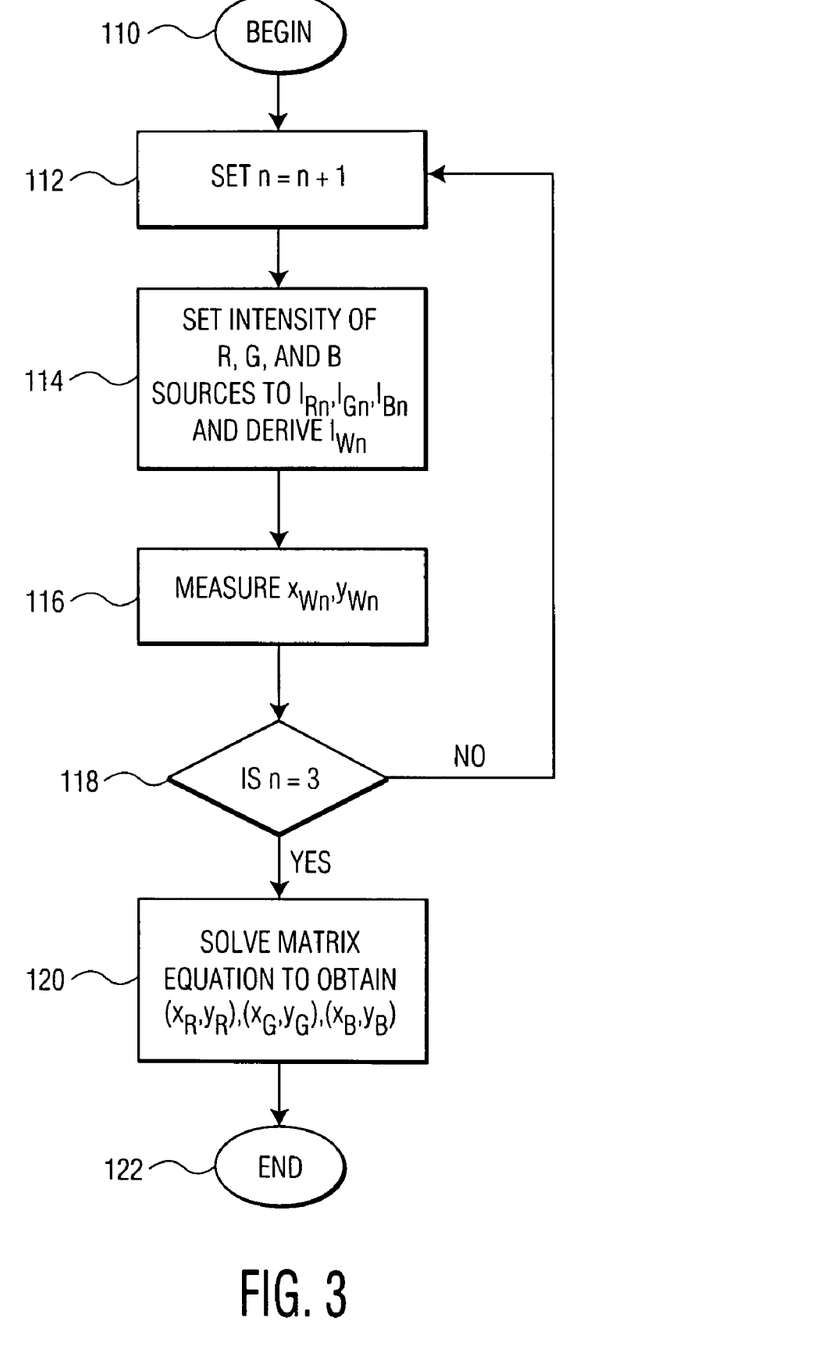
FIG. 3 is a flow chart illustrating the process of primary color identification in accordance with one embodiment of the present invention.

FIG. 3 is a flow chart of a process employed by processor 18 (FIG. 1) to identify the coordinates of color points for each of the red, green, and blue LED light sources, for example, used in monitor 12. At step 110, the processor begins a testing procedure to make the coordinate estimates. Thus at step 112, processor 18 initializes and also sets the number of times n, through which the testing procedure will be accomplished.

At step 114 processor 18 employs equation (4) to estimate the current signal necessary to establish a lumen output levels, $I_{R1}$, $I_{G1}$, $I_{B1}$, respectively for each of the red, green and blue LED light sources. The estimated current signal value is then provided to controller 20, which provides the current signal to the LED light sources so as to achieve their desired output lumen.

At step 116, processor 18 measures the color coordinates of the light generated in response to test signal levels set for red, green and blue LEDs. To this end, tristimulus filter 14 provides output levels $X_{w1}$, $Y_{w1}$, and $Z_{w1}$. From this value, processor 18 calculates the corresponding color coordinates $x_{w1}$ and $y_{w1}$ of the light generated by the combination of red, green and blue LEDs based on $$x_w = \frac{X_w}{X_w + Y_w + Z_w} \quad (5)$$

$$y_w = \frac{Y_w}{X_w + Y_w + Z_w} \quad (6)$$

In accordance with one embodiment of the invention, the testing signals and measurements described in reference with steps 114 and 116 are repeated three times. For each testing measurement a driving signal is provided so as to vary the lumen output level of the three red, green and blue LED light sources, so that the three test value sets are $$\begin{pmatrix} I_{R1} \\ I_{G1} \\ I_{B1} \end{pmatrix}, I_{w1}; \begin{pmatrix} I_{R2} \\ I_{G2} \\ I_{B2} \end{pmatrix}, I_{w2}; \begin{pmatrix} I_{R3} \\ I_{G3} \\ I_{B3} \end{pmatrix}, I_{w3} \quad (7)$$

wherein the lumen output level I for each of the light sources can be derived from equation (4) and the lumen output level of the combined light source $I_w$ is measured by $$I_w = 683 \cdot Y_w \quad (8)$$

It is noted that the invention is not limited in scope in that respect. For example there could be many more test set values that can be employed in accordance with various embodiments of the invention.

Based on the test set values employed, the system measures and calculates the chromaticity coordinates of the white light generated by the three red, green, and blue LEDs for each of those sets, so as to derive $$\begin{pmatrix} x_{w1} \\ y_{w1} \end{pmatrix}, \begin{pmatrix} x_{w2} \\ y_{w2} \end{pmatrix}, \begin{pmatrix} x_{w3} \\ y_{w3} \end{pmatrix} \quad (9)$$

At step 120, processor 18 calculates the color coordinates of the individual, red, green and blue LED light sources as explained hereinafter. Thus, from equation (3) it is known that $$\begin{bmatrix} \frac{x_w}{y_w} \\ 1 \\ \frac{1}{y_w} \end{bmatrix} * I_w = \begin{bmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{bmatrix} * \begin{bmatrix} I_R \\ I_G \\ I_B \end{bmatrix} \quad (10)$$

By substituting equations (7) and (9) into (10), the following matrix equation $$\begin{pmatrix} \frac{x_{w1}}{y_{w1}} & \frac{x_{w2}}{y_{w2}} & \frac{x_{w3}}{y_{w3}} \\ 1 & 1 & 1 \\ \frac{1}{y_{w1}} & \frac{1}{y_{w2}} & \frac{1}{y_{w3}} \end{pmatrix} * \begin{pmatrix} I_{w1} & 0 & 0 \\ 0 & I_{w2} & 0 \\ 0 & 0 & I_{w3} \end{pmatrix} = \quad (11)$$

$$\begin{pmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{pmatrix} * \begin{pmatrix} I_{R1} & I_{R2} & I_{R3} \\ I_{G1} & I_{G2} & I_{G3} \\ I_{B1} & I_{B2} & I_{B3} \end{pmatrix}$$

is provided. Therefore, the color coordinates of the red, green and blue LED light sources can be uniquely solved via $$\begin{pmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{pmatrix} = \quad (12)$$

$$\begin{pmatrix} \frac{x_{w1}}{y_{w1}} & \frac{x_{w2}}{y_{w2}} & \frac{x_{w3}}{y_{w3}} \\ \frac{y_{w1}}{y_{w1}} & \frac{y_{w2}}{y_{w2}} & \frac{y_{w3}}{y_{w3}} \\ \frac{1}{y_{w1}} & \frac{1}{y_{w2}} & \frac{1}{y_{w3}} \end{pmatrix} * \begin{pmatrix} I_{w1} & 0 & 0 \\ 0 & I_{w2} & 0 \\ 0 & 0 & I_{w3} \end{pmatrix} * \begin{pmatrix} I_{R1} & I_{R2} & I_{R3} \\ I_{G1} & I_{G2} & I_{G3} \\ I_{B1} & I_{B2} & I_{B3} \end{pmatrix}^{-1}$$

under the condition that matrix $$\begin{pmatrix} I_{R1} & I_{R2} & I_{R3} \\ I_{G1} & I_{G2} & I_{G3} \\ I_{B1} & I_{B2} & I_{B3} \end{pmatrix} \quad (13)$$

is nonsingular. This condition can be met if no two test points of $$\begin{pmatrix} x_{w1} \\ y_{w1} \end{pmatrix}, \begin{pmatrix} x_{w2} \\ y_{w2} \end{pmatrix}, \begin{pmatrix} x_{w3} \\ y_{w3} \end{pmatrix} \quad (14)$$

lay on the same vertical line in the CIE (x,y) diagram of FIG. 2.

In accordance with one embodiment of the invention, processor 18 determines the color coordinates of the red, green and blue LED s, and provides these coordinates to memory 24 of controller 20.

To this end processor 26 of controller 20 is configured to maintain a desired light color generated by the red, green and blue LEDs by employing equation (3). This follows, because the coordinates of the desired light $x_w$ and $y_w$ are known. In addition, memory 24 contains the color coordinate information for the red, green and blue LEDs. Therefore, the desired lumen output for each of the red, green and blue LED lights sources can be solved. For this desired lumen output, equation (4) provides the desired current signal that should be provided to each of the red, green and blue LEDs via a feedback arrangement as described in FIG. 1.

In accordance with other embodiments of the invention, processor 18 provides the mixed color points test values in a suitable range to coordinate with the characteristics of the color tristimulus filters being used. For example, in order to achieve well-balanced tristimulus color filter outputs, the test points are carefully chosen so that the intensity values of the three red, green, and blue light sources are balanced. This avoids a considerably higher intensity value for one or two light sources in comparison with the remaining light source. Furthermore, in accordance with another embodiment of the invention the test set lumen output levels for the generated light could be chosen such that $I_{w1}=I_{w2}=I_{w3}$ for simpler manipulation and for possible flicker removal. As has been experimentally evaluated, less than 2% light intensity change is not perceivable by human eyes. In another embodiment of the invention, processor 18 performs more than three test sets. In that case, processor 18 employs a least-mean-square estimation to derive the color coordinates of red, green and blue LEDs. For example, if n(n>3) eligible test sets are used, one needs to solve the following equation in least-mean-square fashion $$\begin{bmatrix} \frac{x_{w1}}{y_{w1}} & \frac{x_{w2}}{y_{w2}} & \frac{x_{w3}}{y_{w3}} & \frac{x_{w4}}{y_{w4}} & \cdots & \frac{x_{wn}}{y_{wn}} \\ 1 & 1 & 1 & 1 & \cdots & 1 \\ \frac{1}{y_{w1}} & \frac{1}{y_{w2}} & \frac{1}{y_{w3}} & \frac{1}{y_{w4}} & \cdots & \frac{1}{y_{wn}} \end{bmatrix} \cdot \begin{bmatrix} I_{w1} \\ I_{w2} \\ I_{w3} \\ \cdots \\ I_{wn} \end{bmatrix} = \quad (15)$$

$$\begin{bmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{bmatrix} \begin{bmatrix} I_{R1} & I_{R2} & I_{R3} & \cdots & I_{Rn} \\ I_{G1} & I_{G2} & I_{G3} & \cdots & I_{Gn} \\ I_{B1} & I_{B2} & I_{B3} & \cdots & I_{Bn} \end{bmatrix}$$

A solution is $\begin{bmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{bmatrix} = PIQ^T(QQ^T)^{-1}$ where P is the first matrix in equation 15, I is the second matrix in equation 15, and Q is the forth matrix in equation 15.

In accordance with another embodiment of the invention, the method disclosed in connection with FIG. 3 is repeated for a plurality of different room temperatures, and the chromaticity coordinates for the red, green and blue LED light sources are measured for each of the room temperatures and stored in memory 24 (FIG. 1). Thereafter, during the operation of the system, a temperature sensor measures the operating temperature of the system and retrieves the corresponding chromaticity coordinates so as to maintain the desired color for the light generated by combining the red, green and blue light sources.

Furthermore, the numerical accuracy of identifying color coordinates using the embodiments in accordance with the present invention is better than the prior art measurement scheme described in the background of the invention. As mentioned before, the prior art measurement arrangement utilized a sequential measurement technique, wherein two sets of LEDs were turned off and only one set of LEDs relating to the red, green, or blue color remained "on," so as to measure the color coordinates of the turned "on" LEDs.

The reason that the sequential arrangement approach is not as accurate as the teachings of the present invention can be explained in reference with FIGS. 5(*a*) and 5(*b*). As illustrated, the color matching functions x, y and z are spread out along the visible wavelength. When only one of the colors, for example Red is measured, with the remaining Green and Blue light sources turned "off," a relatively large measurement value in X is expected. A medium measurement value in Y and a small measurement value in Z is expected as well.

Similarly, if only one of the colors, for example Blue is measured, with the remaining Red and Green light sources turned "off," a relatively large value in Z, but smaller values in X and Y are expected.

The relative difference of the values of X, Y, and Z could reach one or two magnitudes. In an arrangement wherein a digital controller is employed with a finite word length, and finite resolution, there will be substantially large relative error for small value measurements.

The present invention overcomes this resolution problem, because the three primary colors are ON at the same time, and the X, Y, and Z measurements are performed simultaneously. Therefore, the values of X, Y and Z have much less differences than the prior art arrangement. This results in remarkably less errors in the measurements, and better color estimation and control accuracy.

I claim:

1. A primary color identification system for measuring color chromaticity coordinates of a plurality of red, green and blue light emitting diodes (LEDs) that generate a combined light, said system comprising:
   a filter located near said LEDs, so as to receive said combined light generated by said red, green and blue LEDs;
   said filter configured to provide signals corresponding to light received from each of said red, green and blue LEDs;
   said signals provided by said filter enabling measurement of chromaticity coordinates of said combined light;
   a processor coupled to said filter and configured to receive said signals provided by said filter;
   said processor further configured to generate control signals associated with each one of said plurality of red, green and blue LEDs, such that a desired light intensity from each of said LEDs is provided;
   a driver circuit coupled to said processor to receive said control signals, said driver circuit further coupled to said plurality of red, green and blue LEDs and configured to provide drive signals enabling said LEDs to produce said desired light intensity.

2. The system in accordance with claim 1, wherein
   said processor estimates a plurality of test control signal sets, so that said LEDs produce a plurality of desired light intensity values in a sequential order; and
   said processor configured to calculate the chromaticity coordinates of each of said red, green and blue LED light sources in accordance with said chromaticity coordinates of said combined light associated with each of said set of test control signals.

3. The system in accordance with claim 2, wherein said processor generates at least three sets of control signals, so that said LEDs, produce at least three desired light intensity values in said sequential order.

4. The system in accordance with claim 2 further comprising means to measure light intensity values corresponding to each one of said red, green and blue LEDs so as to generate a combined light having a desired color chromaticity coordinate.

5. The system in accordance with claim 4, further comprising a feedback control circuit configured to track and maintain said light intensity values that generate a combined light having said desired color chromaticity coordinate.

6. The system in accordance with claim 2, wherein color chromaticity coordinates of each one of said red, green and blue LEDs is calculated based on $$\begin{pmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{pmatrix} = \begin{pmatrix} \frac{x_{w1}}{y_{w1}} & \frac{x_{w2}}{y_{w2}} & \frac{x_{w3}}{y_{w3}} \\ 1 & 1 & 1 \\ \frac{1}{y_{w1}} & \frac{1}{y_{w2}} & \frac{1}{y_{w3}} \end{pmatrix} * \begin{pmatrix} I_{w1} & 0 & 0 \\ 0 & I_{w2} & 0 \\ 0 & 0 & I_{w3} \end{pmatrix} * \begin{pmatrix} I_{R1} & I_{R2} & I_{R3} \\ I_{G1} & I_{G2} & I_{G3} \\ I_{B1} & I_{B2} & I_{B3} \end{pmatrix}^{-1}$$

wherein x and y are color coordinates of each of said red, green, blue and combined light respectively in accordance with said test control signals, and I is the intensity value of each of said LEDs, and said combined light respectively, in accordance with said test control signals.

7. The system in accordance with claim 6 wherein said measurement of said color chromaticity coordinates is handled under the condition that the matrix $$\begin{pmatrix} I_{R1} & I_{R2} & I_{R3} \\ I_{G1} & I_{G2} & I_{G3} \\ I_{B1} & I_{B2} & I_{B3} \end{pmatrix}$$

is nonsingular.

8. The system in accordance with claim 1, wherein said filter is a tristimulus filter.

9. A method for identifying color chromaticity coordinates of a plurality of red, green and blue light sources that together generate a combined light, said method comprising the steps of:
   a) setting the intensity of each of said red, green and blue light sources at a specified test level;
   b) measuring the color chromaticity coordinates of the combined light;
   c) repeating steps (a) and (b) so as to measure a plurality of color chromaticity coordinates of said combined light, wherein each of said chromaticity coordinates of said combined light correspond to a different set of test intensity levels for each of the red, green and blue light sources;
   d) measuring primary color chromaticity coordinates of each of the red, green and blue light sources.

10. The method in accordance with claim 9, wherein said step of measuring the color chromaticity coordinates of said combined light further comprises the step of:
    providing a tristimulus filter near said combined light; and
    calculating said color chromaticity coordinates of said combined light in accordance with signals provided by said tristimulus filter.

11. The method in accordance with claim 9, further comprising the step of estimating light intensity values necessary to obtain said combined light with a desired chromaticity coordinates in accordance with said measured light chromaticity coordinates of each of said red, green and blue light sources.

12. The method in accordance with claim 11, further comprising the step of maintaining said estimated light intensity values for each of said red, green and blue light sources by employing a feedback arrangement.

13. The method in accordance with claim 11 further comprising the step of measuring said color chromaticity coordinates of said combined light in accordance with $$x_w = \frac{X_w}{X_w + Y_w + Z_w} \text{ and } y_w = \frac{Y_w}{X_w + Y_w + Z_w}$$

wherein X, Y and Z are output signals provided by said filter.

14. The method in accordance with claim 13, further comprising the step of measuring said color coordinates of each one of said red, green and blue light sources in accordance with $$\begin{pmatrix} \frac{x_R}{y_R} & \frac{x_G}{y_G} & \frac{x_B}{y_B} \\ 1 & 1 & 1 \\ \frac{1}{y_R} & \frac{1}{y_G} & \frac{1}{y_B} \end{pmatrix} =$$

$$\begin{pmatrix} \frac{x_{w1}}{y_{w1}} & \frac{x_{w2}}{y_{w2}} & \frac{x_{w3}}{y_{w3}} \\ \frac{1}{y_{w1}} & \frac{1}{y_{w2}} & \frac{1}{y_{w3}} \end{pmatrix} * \begin{pmatrix} I_{w1} & 0 & 0 \\ 0 & I_{w2} & 0 \\ 0 & 0 & I_{w3} \end{pmatrix} * \begin{pmatrix} I_{R1} & I_{R2} & I_{R3} \\ I_{G1} & I_{G2} & I_{G3} \\ I_{B1} & I_{B2} & I_{B3} \end{pmatrix}^{-1}$$

wherein X and Y are color coordinates of each of said red, green, blue and combined light respectively in accordance with said test control signals, and I is the intensity value of each of said LEDs, and said combined light respectively, in accordance with said test control signals.

* * * * *